United States Patent [19]
Allred et al.

[11] Patent Number: 4,576,400
[45] Date of Patent: Mar. 18, 1986

[54] RISER REPAIR ASSEMBLY FOR UNDERGROUND IRRIGATION SYSTEMS

[76] Inventors: Von D. Allred, P.O. Box 24; Don B. Harmon, P.O. Box 546, both of Afton, Wyo. 83110

[21] Appl. No.: 578,978
[22] Filed: Feb. 10, 1984
[51] Int. Cl.⁴ .............................................. F16L 19/00
[52] U.S. Cl. .......................................... 285/5; 285/15; 285/162; 285/209; 285/222; 138/97
[58] Field of Search ............... 285/222, 161, 162, 208, 285/209, 308, 322, 5, 382.4, 156, 15, 31, 37; 29/522, 523; 138/97, 99

[56] References Cited

U.S. PATENT DOCUMENTS

| | | | |
|---|---|---|---|
| 330,502 | 11/1885 | McFarland | 285/222 |
| 531,425 | 12/1894 | Porteous | 285/222 |
| 2,121,464 | 6/1938 | Zagorski | 29/523 |
| 2,537,183 | 1/1951 | Bloomer | 285/222 |
| 3,194,107 | 7/1965 | Ballard | 29/522 |
| 3,372,452 | 3/1968 | Firth et al. | 29/523 |
| 3,750,267 | 8/1973 | Otto | 29/523 |
| 3,841,667 | 10/1974 | Sands | 285/39 |
| 3,863,960 | 2/1975 | Andersson | 285/39 |
| 3,879,069 | 4/1975 | Oostenbrink | 285/162 |
| 3,953,555 | 4/1976 | Gley | 261/124 |
| 4,058,329 | 11/1977 | Johaasson | 285/162 |
| 4,182,152 | 1/1980 | Vaill et al. | 29/523 |

FOREIGN PATENT DOCUMENTS 480827 3/1938 United Kingdom ............ 285/382.4

Primary Examiner—Cornelius J. Husar
Assistant Examiner—Eric Nicholson
Attorney, Agent, or Firm—Roland H. Shubert

[57] ABSTRACT

A repair assembly for broken or leaking risers in underground irrigation systems is provided. The repair assembly is adapted to be inserted into a hole through the wall of a buried water distribution line and is held in place by locking tangs engaging the interior surface of the distribution line and by a locking ring flange disposed about the exterior of the assembly and bearing on the exterior wall of the distribution line.

11 Claims, 6 Drawing Figures

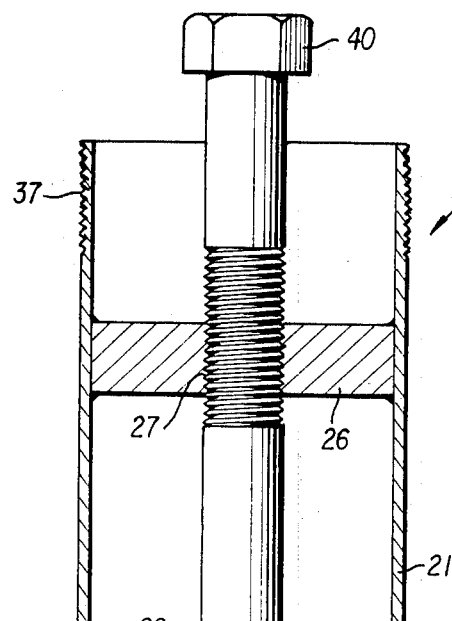
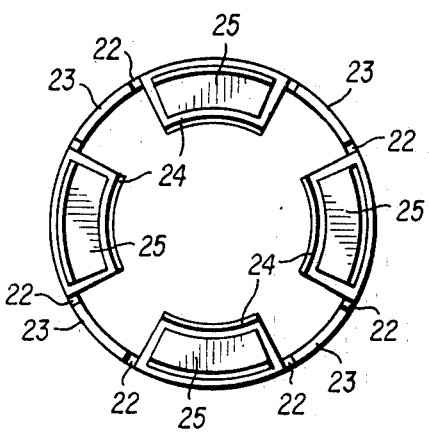
FIG. 2
FIG. 3
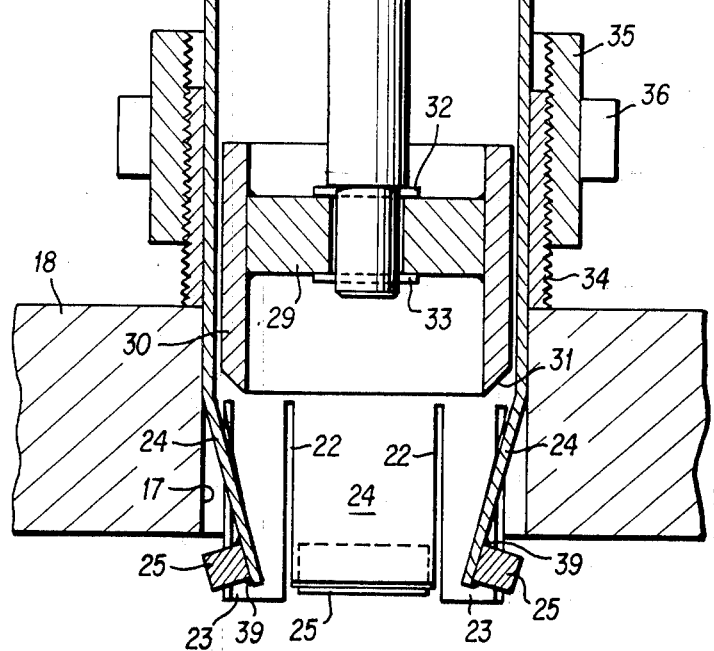
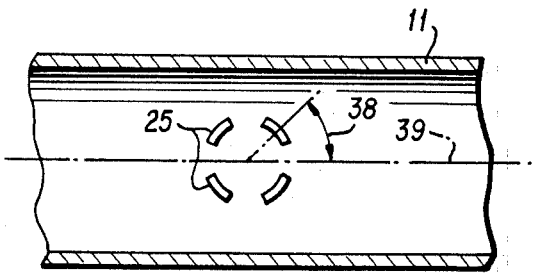
FIG. 6

RISER REPAIR ASSEMBLY FOR UNDERGROUND IRRIGATION SYSTEMS

BACKGROUND OF THE INVENTION

This invention relates generally to a method and means for repairing underground irrigation systems.

More particularly, this invention relates to a repair assembly for broken or leaking risers in an underground irrigation system and to a method for the use of that assembly.

In many parts of the American West, particularly in the Rocky Mountain states and California, it has become common to distribute irrigation water through a system of underground mains and laterals. The mains and laterals are typically constructed of reinforced concrete or Transite pipe with the mains often having an internal diameter of several feet and the laterals ranging downwardly to an internal diameter of six to eight inches. Both mains and laterals are buried deeply enough, usually about two and one half feet, to not interfere with cultivation and to protect against freezing.

Risers are spaced along the distribution lines to allow distribution of irrigation water on the land surface adjacent each riser. The risers are typically constructed of steel pipe, extend vertically from the main or lateral to above the ground surface, and are equipped with an above-ground valve to control water flow. The lower end of each riser is connected to the main or lateral by means of a threaded joint in the pipe wall. Water pressure within the distribution system may range as high as sixty psi.

The mains and laterals have a long service life. However, there is relatively frequent failure of the threaded joint connecting risers to distribution lines. Joint failure is believed to be caused primarily by vibration of high pressure water flowing through the riser and to the surge and hammer occurring during opening and closing of the riser valve. Joint failure results in water leakage which washes out that section of distribution line and requires that the line be closed down for repair.

Ordinarily, joint failure results in the destruction of the threads formed in the distribution pipe wall. Consequently, it is present practice to replace that section of main or lateral containing the riser joint. This practice requires use of a backhoe to excavate along the pipe for a distance upstream and downstream of the riser. A section of pipe, typically some ten to twelve feet in length and containing the riser joint, is then cut out and removed. A replacement pipe section containing a new riser joint is then installed using gasketed flanges to connect and seal each end of the replacement section to the existing pipe ends.

The present techniques for repairing leaking risers are difficult, expensive and require extensive excavation. Up to this time, no practical alternatives to the replacement of a section of distribution line upon riser joint failure have been developed. Hence, it is apparent that a means and method for repair of riser joints without replacement of the distribution line has significant practical benefit.

SUMMARY OF THE INVENTION

This invention provides a riser repair assembly and a method for its use. The repair assembly comprises a cylindrical casing or housing having a plurality of tangs, preferably eight, disposed at one end. Alternate tangs are provided with an outwardly extending lug adapted to engage the inner wall of a water distribution line. The tang end of the assembly is inserted through a hole in the wall of the distribution line, the lug bearing tangs are spread outwardly to engage the inner wall of the distribution line and the assembly is locked in place by a ring flange bearing on the outer surface of the distribution line wall. The other, or upper, end of the repair assembly is adapted for connection to a riser assembly comprising a stand pipe, valve and connection means to a surface distribution system.

Hence, it is an object of this invention to provide a method and means for repairing defective risers without replacement of a section of distribution line.

It is a specific object of this invention to provide a repair assembly for connecting a metal riser to a concrete or Transite water distribution line.

Other objects of this invention will be apparent from the following description of certain preferred embodiments.

DESCRIPTION OF THE DRAWING

A specific embodiment of the invention is illustrated by the drawing in which:

FIG. 2 is a partial sectional view in elevation of the repair assembly of this invention;

FIG. 3 is a bottom view of the repair assembly showing the attitude of guide and locking tangs;

FIG. 6 shows the arrangement of the repair assembly on a water distribution line.

DESCRIPTION AND DISCUSSION OF THE INVENTION

Figure 1:
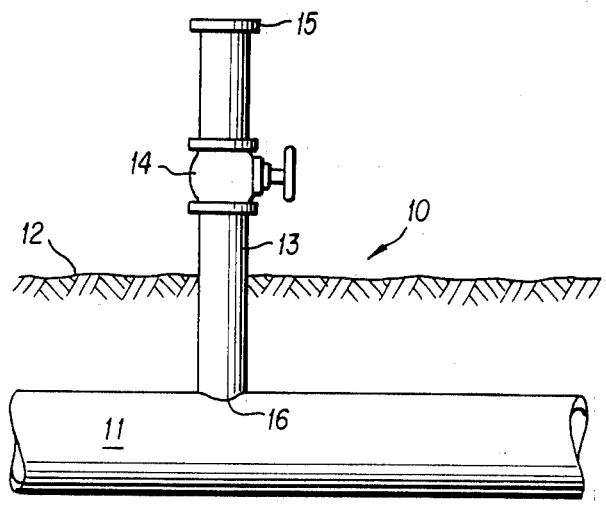
FIG. 1 is a schematic view illustrating a conventional arrangement of a buried irrigation water distribution line and riser.

The invention will be explained and described with reference to the accompanying drawing depicting certain preferred embodiments of the invention. Like reference characters refer to the same elements in each of the Figures making up the drawing.

Referring now to FIG. 1, there is shown at 10 the customary arrangement of an underground irrigation system. A water distribution line 11 is buried below the ground surface 12 at a depth which does not interfere with normal cultivation. Spaced along the distribution line 11 are risers 13 which communicate with the interior of the water mains or laterals. An above-ground valve 14 controls the flow of water through the riser. Riser 13 may terminate in a connection flange or similar means 15 for attachment to a sprinkler system or other conventional water distribution system.

Riser 13 is typically constructed of steel pipe having a diameter of about four inches. As has been set out previously, vibration and other stresses, including collision of farm equipment with the above-ground section of the riser, result in relatively frequent failure of the threaded joint 16 connecting the riser to the distribution line. Water leakage from the failed joint washes out the soil above the joint and around the riser. Water flow through line 11 must then be shut off and the riser joint 16 must be repaired or replaced.

Often the leakage from joint failure erodes sufficient soil to leave the joint exposed. In such cases, use of the instant invention requires no additional excavation for repair of the leaking section. To use the riser repair assembly of this invention it is necessary, of course, to shut off water flow through the distribution line 11. Riser 13 is then removed either by unthreading it from the line or, in extreme cases, merely lifting it out of its connection with the distribution line. The damaged or failed threading in the pipe wall is then drilled or honed out to produce a smooth hole through the pipe wall of slightly enlarged diameter as compared to the original threaded joint.

Note that it is not possible to cut new threads in the pipe wall as it is constructed of concrete or Transite and the original threads were formed by molding during fabrication of the pipe. Honing or reaming may be accomplished using conventional tools.

After removal of the riser and reaming of the hole through the pipe wall, the repair assembly of this invention, illustrated in FIG. 2, is inserted into the pipe wall. Turning now to FIG. 2, repair assembly 20 comprises a cylindrical housing 21 having a lower end adapted for insertion into the reamed hole 17 in the pipe wall 18. Housing 21 is preferably formed from a section of relatively thin-walled steel pipe having a diameter equal to that of the original riser. A series of eight slots 22 are cut into the lower end of housing 21 for a distance somewhat shorter than the wall thickness of pipe 11. Slots 22 are all of equal depth and extend parallel to the housing axis to form eight tang members. These eight tang members comprise four guide tangs 23 alternating with four locking tangs 24. Each locking tang 24 is provided with an outwardly extending lug 25 attached, suitably by weld 39, adjacent its free end and perpendicular to the axis of housing 21. The top side of each lug 25 preferably forms a right angle with its companion tang 24 so as to provide a secure lock with the interior surface of the pipe wall in a manner which will be later described.

All four locking tangs 24 are then bent inwardly a sufficient amount so that the projection of lugs 25 does not extend beyond the diameter of housing 21. Guide lugs 23 remain unbent as extensions of the housing wall. The resulting attitude of the guide tangs and locking tangs, each with its companion lug, is shown in FIG. 3. As is shown in FIG. 3, it is preferred but not required, that each locking tang include about twice the arc length of each guide tang. It is necessary for proper functioning of the repair assembly that opposing pairs of locking tangs be of equal arc length and that the midpoint of opposing lug pairs be disposed at essentially 180° one from the other. In a preferred embodiment, each guide tang and adjacent locking tang encompasses 90° of arc with the arc length of the locking tang being about twice that of the guide tang.

Figure 4:
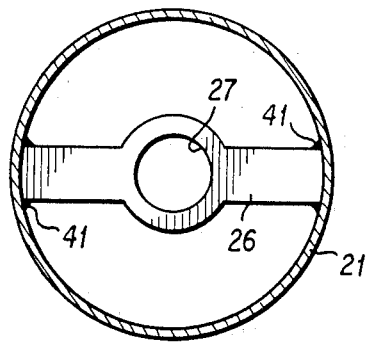
FIG. 4 is a detail view of the cross bar assembly.
Figure 5:
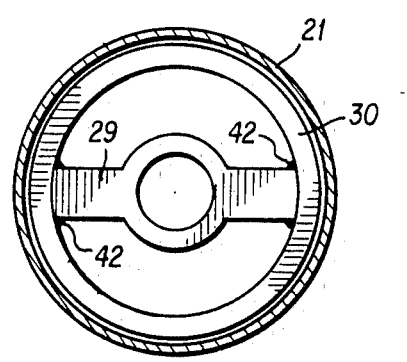
FIG. 5 details the arrangement of the wedge member, wedge bar and housing.

Disposed within housing 21 at an upper portion thereof is cross bar 26 shown in a more detailed view in FIG. 4. Cross bar 26 is fixedly attached within housing 21 as by welds 41 securing its ends to the housing interior. A threaded hole 27 is provided in the center of cross bar 26 to accept an upper, matingly threaded, portion of wedge activating rod 28. The lower end of rod 28 rotatably engages wedge bar 29 which is fixedly disposed across the open interior of cylindrical wedge member 30. Wedge member 30 by means of welds 42 comprises a relatively thick walled metal cylinder having an inwardly tapered lower end 31. The external diameter of wedge member 30 is sized just slightly smaller than the internal diameter of housing 21 so as to allow free movement of the wedge relative to the housing. Rod 28 is fixed to, but free to rotate within, wedge bar 29 by means of thrust washer 32 and retaining means 33. FIG. 5 shows in plan view the arrangement of the wedge member, wedge bar and housing.

A lower exterior portion 34 of housing 21 is threaded for engagement with internally threaded ring flange 35 which desirably may be provided with wrench lugs 36. The top end of housing 21 is preferably provided with external standard pipe thread 37.

The procedure for use of the assembly for repairing a leaking riser is as follow. After the leaking riser assembly has been removed, the remaining broken threads in the main or lateral are drilled or honed out leaving a round hole through the pipe wall with good solid sides. The hole in the pipe wall is then liberally coated with a sealant compound as is the interior and exterior surfaces of the tang members. A preferred sealant is of the type having high adhesion and used commercially as a sealing compound for fuel tanks and for similar purposes. Generally speaking, sealing compounds meeting Mil-Spec 8802E are well suited for use with this invention although other commercially available sealants are suitable as well. A commercial sealant found to work well in this application is sold under the tradename Pro-Seal 890 manufactured by Essex Chemical Corporation.

The sealant-coated tang end of the repair assembly is then inserted into the hole in the pipe wall. The assembly is then rotated so as to position the centers of each of locking tangs 24 and lugs 25 at an equal angle 38 (FIG. 6) from the axis 39 of line 11. In the case of equally spaced tang members, angle 38 will be 45°. This rotational positioning of the repair assembly relative to the pipe axis is critical to successful use of the repair assembly. As may be appreciated, the interior surface of pipe 11 is curved. Positioning opposite lugs 25 at an equal angle relative to the pipe axis ensures that all of the lugs will grippingly contact the internal surface of the pipe wall.

After the repair assembly is properly positioned within the pipe wall, rod 28 is rotated by wrench attachment to bolt head 40. Rotation of rod 28 forces cylindrical wedge member 30 downwardly to engage the inwardly bent locking tangs 24 and force them outwardly so that lugs 25 are positioned to contact the inner surface of the pipe wall. Ring flange 35 is then screwed down to pressingly contact the exterior surface of the pipe wall and to bring lugs 25 into gripping contact with the interior of the pipe wall. The sealant is allowed adequate time to cure thus completing the installation of the repair assembly. The original riser pipe 13 is cut to proper length, is threaded, and is then attached to the top threaded end 37 of housing 21. Thereafter, line 11, the repair assembly 20, and the lower end of riser 13 are backfilled with soil to complete the repair procedure. Note that wedge member 30 remains in place within the repair assembly to permanently hold locking tangs 24 in an expanded, or spread, position.

As may be appreciated, the repair assembly of this invention provides substantial advantage as compared to the previous practice of replacing a pipe section containing a riser joint. Repair of a leaking riser has been accomplished in less than one hour through use of this invention at substantially less expense than with prior art techniques and with minimal surface disturbance.

Minor variations and modifications of the preferred embodiments illustrated and described will be apparent to those skilled in the art without departing from the spirit and scope of the claimed invention.

We claim:

1. A repair assembly for broken or leaking risers in underground irrigation systems comprising:

an elongated cylindrical casing having a top end and a bottom end, said bottom end adapted for insertion into a circular hole through the wall of a buried water distribution line;

a plurality of slots cut into said bottom end parallel to the axis of said cylindrical casing, said slots defining a plurality of tang members, each of said tang members having an attached end and a free end;

outwardly extending lugs fixed to the exterior of alternate tang members, the free ends of said tang members with affixed lugs bent inwardly a sufficient degree that said lugs do not project beyond the diameter of said cylindrical casing;

wedge means disposed within said casing and adapted to move downwardly to spread said lug affixed tang members outwardly, and a retaining flange disposed about the exterior of said casing at a lower section thereof above said tang members.

2. The repair assembly of claim 1 having eight tang members, four of said tang members functioning as guide tangs and four of said tang members with lugs affixed functioning as locking tangs.

3. The repair assembly of claim 2 wherein said wedge means comprises a thick walled cylinder slidingly fitting within said casing and having a tapered bottom edge adapted to engage said locking tangs and bend them outwardly upon downward movement of said cylinder.

4. The repair assembly of claim 3 including a wedge means activating rod, the lower end of said rod rotatably fixed to a bar member extending across the interior of said cylinder, an upper portion of said rod threadably engaging a cross bar fixedly disposed across the interior of said cylindrical casing at an upper section thereof.

5. The repair assembly of claim 4 wherein an end of said wedge means operating rod extends above the top of said cylindrical casing and terminates in wrench attachment means.

6. The repair assembly of claim 1 wherein said retaining flange comprises an internally threaded ring engageable with a threaded exterior portion of said cylindrical casing above said tang members.

7. The repair assembly of claim 1 wherein the top end of said cylindrical casing is threaded for attachment to a riser assembly.

8. The repair assembly of claim 2 wherein said tang members are slightly shorter in length than is the wall thickness of said water distribution line.

9. The repair assembly of claim 2 wherein opposing pairs of locking tangs are of equal arc length and the midpoint of each of said opposing locking tangs are disposed at essentially 180° one from the other.

10. The repair assembly of claim 9 wherein one pair of locking tangs is disposed at right angles to the other pair of locking tangs.

11. The repair assembly of claim 2 wherein each locking tang includes about twice the arc length of each guide tang.

* * * * *